(No Model.) 2 Sheets—Sheet 2.

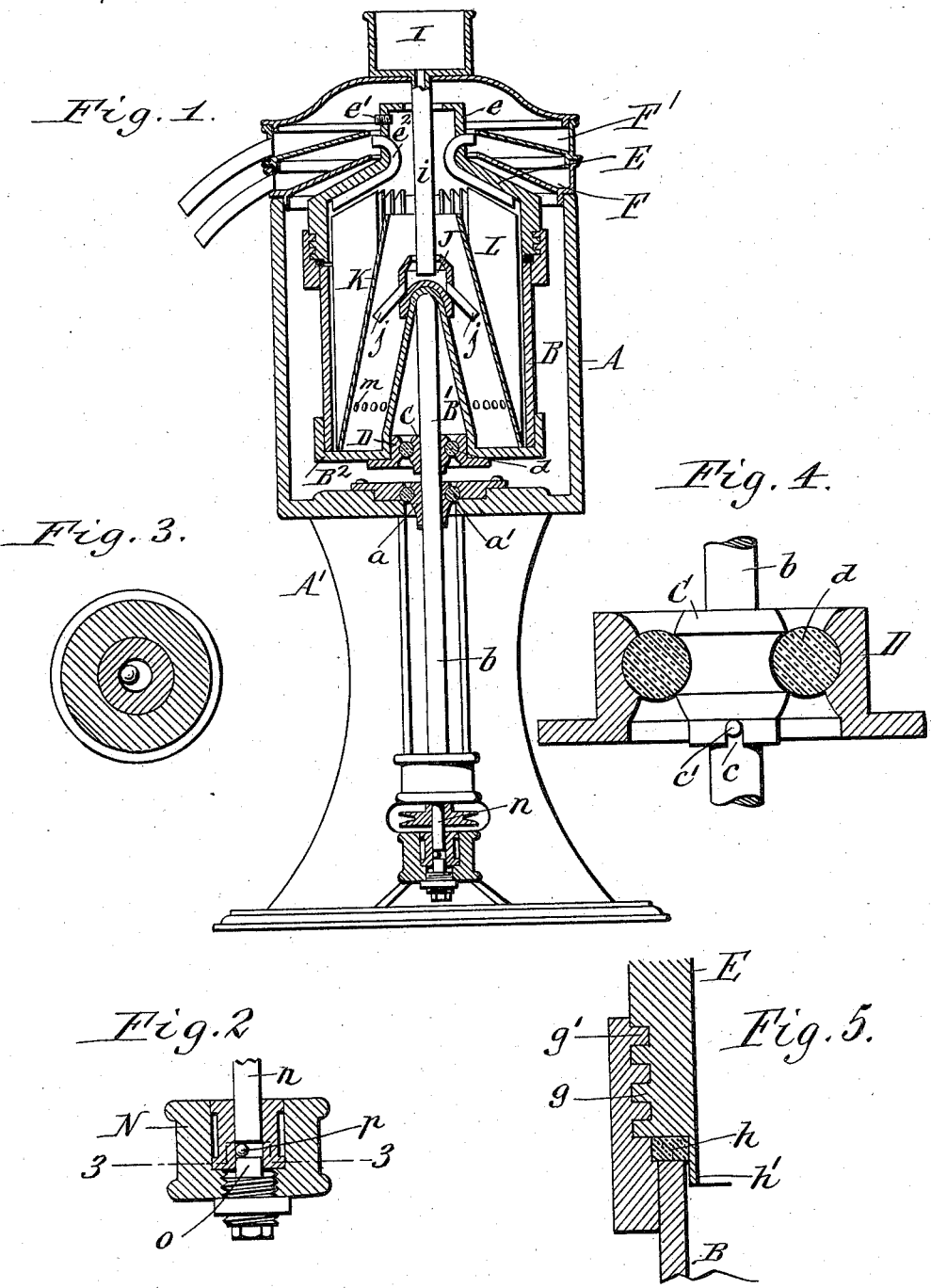

C. J. LUNDSTROM.
CENTRIFUGAL LIQUID SEPARATOR.

No. 579,301. Patented Mar. 23, 1897.

Fig. 6.

Fig. 7.

Witnesses:
Theo. L. Popp.
F. Gustav Wilhelm.

C. J. Lundstrom
Inventor.
By Wilhelm & Bonner.
Attorneys.

UNITED STATES PATENT OFFICE.

CARL JOHAN LUNDSTROM, OF LITTLE FALLS, NEW YORK, ASSIGNOR TO D. H. BURRELL & CO., OF SAME PLACE.

CENTRIFUGAL LIQUID-SEPARATOR.

SPECIFICATION forming part of Letters Patent No. 579,301, dated March 23, 1897.

Application filed August 24, 1893. Serial No. 483,936. (No model.) Patented in England August 4, 1893, No. 15,843; in Germany August 29, 1893, No. 80,877, and in Sweden August 29, 1893, No. 5,304.

*To all whom it may concern:*

Be it known that I, CARL JOHAN LUNDSTROM, a subject of the King of Sweden and Norway, residing at Little Falls, in the county of Herkimer and State of New York, have invented a new and useful Improvement in Centrifugal Liquid-Separators, of which the following is a specification.

I have obtained the following foreign Letters Patent for the invention hereinafter set forth, to wit: Letters Patent of Great Britain, No. 15,843, dated August 4, 1893; Letters Patent of Germany, No. 80,877, dated August 29, 1893, and Letters Patent of Sweden, No. 5,304, dated August 29, 1893.

This invention relates to that class of centrifugal separating-machines which are employed for separating a compound liquid or emulsion into its constituent liquids of different densities, particularly for separating full milk into cream and skim-milk.

One object of this invention is to provide the bowl of the separator with a simple device for increasing its separating capacity and intercepting the solid impurities contained in the milk before they reach the outer wall of the bowl.

Another object of my invention is to connect the spindle and the bowl by a yielding driving device in such manner that the bowl is compelled to rotate with the spindle, but permitted to balance itself on the spindle within certain limits.

Another object of my invention is to improve the packing between the cover of the bowl and the body thereof.

Another object of my invention is to improve the step-bearing on which the spindle turns, so as to reduce the friction by a simple, durable, and inexpensive device.

In the accompanying drawings, consisting of two sheets, Figure 1 is a sectional elevation of a centrifugal creamer provided with my improvements. Fig. 2 is a sectional elevation of the step-bearing on an enlarged scale. Fig. 3 is a horizontal section through the step-bearing in line 3 3, Fig. 2. Fig. 4 is a sectional elevation of the yielding driving device interposed between the spindle and the lower portion of the bowl. Fig. 5 is a vertical section of the joint between the cover and the body of the bowl on an enlarged scale. Fig. 6 is a sectional elevation of the bowl and connecting parts on an enlarged scale. Fig. 7 is a horizontal section in line 7 7, Fig. 6.

Like letters of reference refer to like parts in the several figures.

A represents the stationary curb or casing, supported on the frame A' in the usual way.

B is the separating bowl or drum, and $b$ the driving-spindle thereof.

The upper part of the spindle is journaled in a bearing $a$, which is arranged in the upper part of the frame A' and made laterally yielding by a rubber ring $a'$, interposed between the bearing and the surrounding portion of the frame in the usual manner. The spindle extends upwardly above the upper bearing $a$ and into the hollow conical hub B', formed on the bottom $B^2$ of the bowl. This hub rests loosely upon the rounded upper end of the spindle, so that the bowl is capable of a limited rocking movement on the spindle. This oscillatory movement is limited by a yielding connection which is interposed between the lower portion of the hub and the spindle and which is constructed as follows:

C is a sleeve which surrounds the spindle within the lower portion of the conical hub. This sleeve is provided in its lower edge with a notch $c$, by which it is interlocked with a pin $c'$, secured to the spindle, so that the sleeve is compelled to turn with the spindle. Other suitable devices may, however, be employed for this purpose. $d$ is a yielding ring, preferably of rubber, which surrounds the sleeve and is seated in an annular groove $c^2$, formed in the outer surface of the sleeve.

D is a flanged collar which surrounds this yielding ring and which is secured to the bottom of the bowl. This collar is provided in its inner surface with an annular groove $d'$, in which the yielding ring is also seated, so that the latter is clamped between the sleeve and the collar. The yielding nature of this ring permits of a slight oscillation of the bowl on the spindle in balancing itself, and the frictional contact of the yielding ring with the sleeve and collar transmits the motion of the spindle to the bowl and causes the latter to rotate with the spindle.

E represents the cover of the bowl, which is contracted upwardly to a neck $e$, in which the cream-discharge screw $e'$ is arranged and through which the skim-milk pipes $e^2$ open.

F is the skim-milk receptacle resting upon the curb A, and F' is the cream-receptacle resting upon the skim-milk receptacle F, both receptacles being of ordinary construction.

The cover E is provided at its lower end with an external screw-thread $g$, by which it is screwed into a flange $g'$, formed on the upper end of the peripheral wall of the bowl and provided with an internal screw-thread and with a seat for the packing-ring $h$. This cover is provided on the inner side of the packing-ring with a depending lip $h'$, which confines the packing-ring on its inner side and prevents the same from being flattened excessively and projecting into the bowl. This lip may be arranged flush with the inner surface of the peripheral wall of the bowl, as shown in Fig. 6, or it may overhang the inner surface thereof, as shown in Fig. 5.

I represents the stationary feed-cup resting upon the cream-receptacle F' and provided with a feed-pipe $i$, which extends downwardly into the bowl.

J represents the rotating feed-cup secured to the apex of the hub B' of the bowl and provided with one or more discharge-pipes $j$, which extend outwardly into the bowl beyond the cream-wall.

K represents a hollow separating-cone which is arranged in the liquid-space of the bowl and which rests upon the bottom of the bowl at or near the peripheral wall thereof and extends upwardly and inwardly from the bottom toward the cream-outlet and terminates with its contracted end in the vicinity of the cream-outlet. This cone extends diagonally through the thickness of the annular body of liquid in the bowl and divides that body into an inner portion, which is located inside of the cone, and an outer portion, which is located between the cone and the peripheral wall of the drum. The diameter of the small end of the cone is such that the cream, which is separated on the inner side of the cone, can pass upwardly beyond the small end of the cone and reach the cream-outlet of the bowl. The diameter of the small end of the cone is preferably about the same as that of the circle formed by the cream-wall where it escapes from the neck of the bowl. The smaller the diameter of the small end of the cone the thicker is the cream which is discharged therefrom.

L represents upright blades which are secured to the outer surface of the cone and which extend to the peripheral wall of the bowl or nearly to the same. These blades prevent the liquid on the outer side of the cone from changing its position circumferentially within the bowl, and they also divide the liquid-space between the bowl and the cone into several upright spaces, in which the liquid is comparatively quiet, whereby the separation of the cream from the skim-milk in the outer liquid-space is promoted.

$m$ represents openings formed in the cone at a short distance above its lower end and establishing communication between the inner liquid-space and the outer liquid-space above the lower edge of the cone. These openings permit of the free passage of liquid from the inner to the outer side of the cone when the lower edge of the cone has become encumbered with deposited solid matter, and so permit of the interception of the solid impurities contained in the milk on the inner side of the cone along the lower edge thereof without interfering with the flow of the liquid from the inner to the outer side of the cone, while the cone prevents the solid impurities from being deposited against the inner side of the outer wall of the bowl. The full milk is first subjected to a primary separation on the inner side of the cone, whereby the largest cream-globules, which have the greatest buoyancy and are most readily separated, are first separated from the milk, and the partially-skimmed milk, which accumulates in the outer layer of the inner portion of the body of liquid, is then subjected on the outer side of the cone to a further or secondary separation, whereby the smaller cream-globules, having less buoyancy, are separated from the skimmed milk and whereby the operation of skimming is completed.

So long as the lower edge of the cone remains unencumbered by deposited solid matter the heavy partially-separated liquid escapes also past the lower edge of the cone, which latter rests loosely on the bottom of the bowl, as described in my Letters Patent No. 514,156, dated February 6, 1894.

By providing several cones of different diameters at the small end the consistency of the cream which is delivered by the machine can be changed by changing the cone.

$n$ represents the lower reduced portion of the spindle, N the bearing which surrounds the same and extends below it, and O the step inserted in the lower end of the bearing.

$p$ is a steel ball arranged in the bearing upon the step and below the spindle. This ball is somewhat smaller in diameter than the diameter of the spindle, so that the point at which the spindle rests upon the ball lies outside of the center line of the spindle, whereby the ball is compelled to travel in a circular path with the spindle. The ball is arranged in the open chamber formed in the bearing below the spindle and free to change its position, and it has its bearing-points at the top, bottom, and outer side, whereby the ball wears uniformly, while the friction is greatly reduced.

While this machine has been described as applied to the creaming of milk, it may be used for the separation of other compound liquids.

I claim as my invention—

1. The combination with a separating-bowl having discharges for the separated cream and skim-milk, and a supply device for the full milk, of a hollow separating-cone which extends diagonally through the liquid-space of the bowl and which is imperforate except that it is provided at its large end with a passage for the escape of the heavy separated liquid and adjacent to the large end with supplemental escape-passages for the same liquid, and which discharges the cream at its small end, substantially as set forth.

2. The combination with the spindle and the separating-bowl having a hub extending above its bottom and hung loosely upon the spindle, of a sleeve surrounding the spindle near the lower portion of the hub and provided with a notch, a projection secured to the spindle and entering said notch, and a yielding ring interposed between said sleeve and the lower portion of the bowl, substantially as set forth.

Witness my hand this 16th day of August, 1893.

CARL JOHAN LUNDSTROM.

Witnesses:
GEO. W. SEARLES,
G. PRICHARD.